(12) United States Patent
Willman et al.

(10) Patent No.: US 7,643,484 B2
(45) Date of Patent: Jan. 5, 2010

(54) NETWORK ABSTRACTION AND ISOLATION LAYER RULES-BASED FEDERATION AND MASQUERADING

(75) Inventors: Charles A. Willman, Austin, TX (US); Scott C. Johnson, Austin, TX (US); Dave D. McCrory, Cedar Park, TX (US); Robert A. Hirschfeld, Austin, TX (US)

(73) Assignee: Surgient, Inc., Austin, TX (US)

( * ) Notice: Subject to any disclaimer, the term of this patent is extended or adjusted under 35 U.S.C. 154(b) by 696 days.

(21) Appl. No.: 11/053,770

(22) Filed: Feb. 9, 2005

(65) Prior Publication Data
US 2005/0147120 A1    Jul. 7, 2005

Related U.S. Application Data

(63) Continuation-in-part of application No. 10/950,355, filed on Sep. 24, 2004.

(60) Provisional application No. 60/543,854, filed on Feb. 11, 2004, provisional application No. 60/506,309, filed on Sep. 26, 2003.

(51) Int. Cl.
*H04L 12/28* (2006.01)
*H04L 12/56* (2006.01)

(52) U.S. Cl. .................. 370/392; 370/389; 370/397; 370/399; 370/395.54; 709/227; 709/229; 709/238

(58) Field of Classification Search .............. 370/466, 370/389, 392, 397, 399, 395.54; 709/223–229, 709/238
See application file for complete search history.

(56) References Cited

U.S. PATENT DOCUMENTS

| 4,912,628 | A | 3/1990 | Briggs |
| 5,062,037 | A | 10/1991 | Shorter et al. |
| 5,201,049 | A | 4/1993 | Shorter |
| 5,611,050 | A | 3/1997 | Theimer et al. |
| 5,757,924 | A | 5/1998 | Friedman et al. |
| 5,802,290 | A | 9/1998 | Casselman |
| 5,996,026 | A | 11/1999 | Onodera et al. |
| 5,999,518 | A | 12/1999 | Nattkemper et al. |
| 6,003,050 | A | 12/1999 | Silver et al. |

(Continued)

OTHER PUBLICATIONS

Henry Baltazar, Virtual Storage Age, eWEEK, pp. 45 and 48, Aug. 27, 2001, Ziff Davis Media Inc., New York, New York.

(Continued)

*Primary Examiner*—Daniel J. Ryman
*Assistant Examiner*—Thinh D Tran
(74) *Attorney, Agent, or Firm*—Gary R. Stanford

(57) ABSTRACT

A computer system of a federation coupled to a network including a server having an internal address associated with a first subnet and a network abstraction and isolation layer rules-based federation and masquerading (NAIL RBFM) interface that interfaces the server with the network. The NAIL RBFM interface transforms the internal address between the first subnet and a second subnet for intra-federation communications. The NAIL RBFM interface performs transform and inverse transform operations to convert between internal and external addresses of intra-federation network traffic. The operations may be performed on source and destination addresses, and may be configured in any of several manners, such as modifying at least one bit of an address, replacing at least one octet of an IP address, substituting a prefix of an address, replacing an entire address, etc.

8 Claims, 3 Drawing Sheets

U.S. PATENT DOCUMENTS

| | | | |
|---|---|---|---|
| 6,023,724 A * | 2/2000 | Bhatia et al. | 709/218 |
| 6,041,347 A | 3/2000 | Harsham et al. | |
| 6,067,545 A | 5/2000 | Wolff | |
| 6,075,938 A | 6/2000 | Bugnion et al. | |
| 6,104,699 A | 8/2000 | Holender et al. | |
| 6,118,784 A * | 9/2000 | Tsuchiya et al. | 370/401 |
| 6,130,892 A * | 10/2000 | Short et al. | 370/401 |
| 6,185,601 B1 | 2/2001 | Wolff | |
| 6,192,417 B1 * | 2/2001 | Block et al. | 709/249 |
| 6,256,637 B1 | 7/2001 | Venkatesh et al. | |
| 6,263,358 B1 | 7/2001 | Lee et al. | |
| 6,272,523 B1 | 8/2001 | Factor | |
| 6,272,537 B1 | 8/2001 | Kekic et al. | |
| 6,370,560 B1 | 4/2002 | Robertazzi et al. | |
| 6,496,847 B1 | 12/2002 | Bugnion et al. | |
| 6,535,511 B1 | 3/2003 | Rao | |
| 6,567,839 B1 | 5/2003 | Borkenhagen et al. | |
| 6,633,916 B2 | 10/2003 | Kauffman | |
| 6,640,239 B1 | 10/2003 | Gidwani | |
| 6,760,775 B1 * | 7/2004 | Anerousis et al. | 709/238 |
| 6,865,613 B1 * | 3/2005 | Millet et al. | 709/245 |
| 6,931,003 B2 | 8/2005 | Anderson | |
| 6,985,479 B2 | 1/2006 | Leung et al. | |
| 6,985,485 B2 | 1/2006 | Tsuchiya et al. | |
| 7,020,720 B1 * | 3/2006 | Donahue et al. | 709/245 |
| 7,139,841 B1 | 11/2006 | Somasundaram et al. | |
| 7,154,891 B1 | 12/2006 | Callon | |
| 7,215,669 B1 | 5/2007 | Rao | |
| 7,219,161 B1 | 5/2007 | Fagundo et al. | |
| 7,280,557 B1 * | 10/2007 | Biswas et al. | 370/465 |
| 2002/0065864 A1 | 5/2002 | Hartsell et al. | |
| 2002/0129082 A1 | 9/2002 | Baskey et al. | |
| 2002/0159447 A1 | 10/2002 | Carey et al. | |
| 2004/0044778 A1 * | 3/2004 | Alkhatib et al. | 709/228 |
| 2004/0052216 A1 | 3/2004 | Roh | |
| 2005/0013280 A1 * | 1/2005 | Buddhikot et al. | 370/349 |
| 2006/0013209 A1 * | 1/2006 | Somasundaram | 370/389 |

OTHER PUBLICATIONS

Michael Vizard, Automated help is on the horizon, InfoWorld, Mar. 1, 2002, InfoWorld Media Group, San Francisco, CA.

* cited by examiner

NETWORK ABSTRACTION AND ISOLATION LAYER RULES-BASED FEDERATION AND MASQUERADING

CROSS-REFERENCE TO RELATED APPLICATIONS

This application claims the benefit of U.S. Provisional Application Ser. No. 60/543,854 filed on Feb. 11, 2004, and is a continuation-in-part of U.S. patent application entitled "Network Abstraction And Isolation Layer For Masquerading Machine Identity Of A Computer", Ser. No. 10/950,355, filed Sep. 24, 2004 being commonly assigned and having at least one common inventor, which itself was based on U.S. Provisional Application Ser. No. 60/506,309 filed on Sep. 26, 2003, all of which being incorporated herein by reference in their entireties for all intents and purposes.

BACKGROUND OF THE INVENTION

1. Field of the Invention

The present invention relates to computer networks, and more particularly to network abstraction and isolation layer (NAIL) rules-based federation and masquerading (RBFM) that provides abstraction and/or isolation with masqueraded addresses based on transformation rules that enables servers to communicate on a shared network using unique and predictable addresses.

2. Description of the Related Art

It is desired to deploy servers in multiple groups or "federations", where the servers of a federation work together and are able to communicate directly with one another over a common network link coupled to the federation. The applications executing on the servers typically use hard-coded IP addresses to communicate with the other servers in the federation. It is also desired to deploy multiple copies of an original federation for redundancy, scalability or for other reasons. In conventional configurations using a common network link, this raises the likelihood of a first-tier server from a first federation colliding with another first-tier server from a second federation cloned or copied from the first. One way to solve this problem is to provide a separate private network for each federation so that its member servers may communicate directly with each other without conflict with other federations. This solution adds costs in terms of additional NIC hardware and/or the consumption of virtual network resources within the virtualization platform. It is desired to avoid such additional costs.

A solution is needed that allows intra-group communication (between servers of a given federation) and that prevents inter-group communication conflicts (between servers of different federations) when all of the servers of multiple federations are coupled to the same network link.

SUMMARY OF THE INVENTION

A computer system of a federation coupled to a network according to an embodiment of the present invention includes a server having an internal address associated with a first subnet, and a network abstraction and isolation layer rules-based federation and masquerading (NAIL RBFM) interface that interfaces the server with the network. The NAIL RBFM interface transforms the internal address between the first subnet and a second subnet for intra-federation communications.

In one embodiment, the NAIL RBFM interface performs a transform operation to convert the internal address to an external address associated with the second subnet for outgoing intra-federation network traffic, and performs an inverse transform operation to convert incoming intra-federation network traffic having the external address to the internal address. The NAIL RBFM interface may perform the transform and inverse transform operations on source and destination addresses for the intra-federation communications. The transform and inverse transform operations may be configured in any of several manners, such as modifying at least one bit of an address, replacing at least one octet of an internet protocol (IP) address, substituting a prefix of an IP address, replacing an entire address with a new address, looking up a new or replacement address, etc.

A network according to an embodiment of the present invention includes a network link, first and second federations, and first and second NAIL RBFM interfaces. The first federation is coupled to the network link, is associated with a first subnet and includes a first plurality of servers each having a local address. The second federation also is coupled to the network link, is associated with a second subnet and includes a second plurality of servers. Each server of the second federation is a copy of a corresponding server of the first federation and includes the corresponding local address. Each first NAIL RBFM interface interfaces a corresponding server of the first federation to the network link and performs an address transformation to associate the corresponding server into the first subnet. And each second NAIL RBFM interface interfaces a corresponding server of the second federation to the network link and performs an address transformation to associate the corresponding server into the second subnet.

In one embodiment, each NAIL RBFM interface is operative to identify outgoing traffic to another server within a common one of the first and second federations, to transform source and destination addresses of the outgoing traffic, and to pass the transformed traffic onto the network link. Each NAIL RBFM interface may be operative to identify incoming traffic on the network link from another server within a common one of the first and second federations, to transform source and destination addresses of the incoming traffic, and to pass transformed traffic to the corresponding server.

The address transformation may perform any one of several operations, such as, for example, modifying at least one bit of an address, replacing at least one octet of an internet protocol (IP) address, substituting a prefix of an IP address, replacing an address, looking up an address, etc. Each of the first and second NAIL RBFM interfaces may be configured to selectively block communications between the first and second federations.

A method of network abstraction and isolation layer rules-based federation and masquerading to enable intra-federation communication among servers of each federation of a plurality of federations coupled to a network according to an embodiment of the present invention includes detecting intra-federation communications associated with a first subnet, transforming the intra-federation communications between the first subnet and a second subnet, and passing the transformed intra-federation communications to an indicated destination. The transforming may include converting source and destination addresses, substituting at least one bit of at least one address, replacing at least one octet of at least one IP address, substituting a prefix of at least one address, replacing each address with a new address, looking up a replacement address, etc.

BRIEF DESCRIPTION OF THE DRAWINGS

The benefits, features, and advantages of the present invention will become better understood with regard to the following description, and accompanying drawings where.

DETAILED DESCRIPTION

Figure 1:
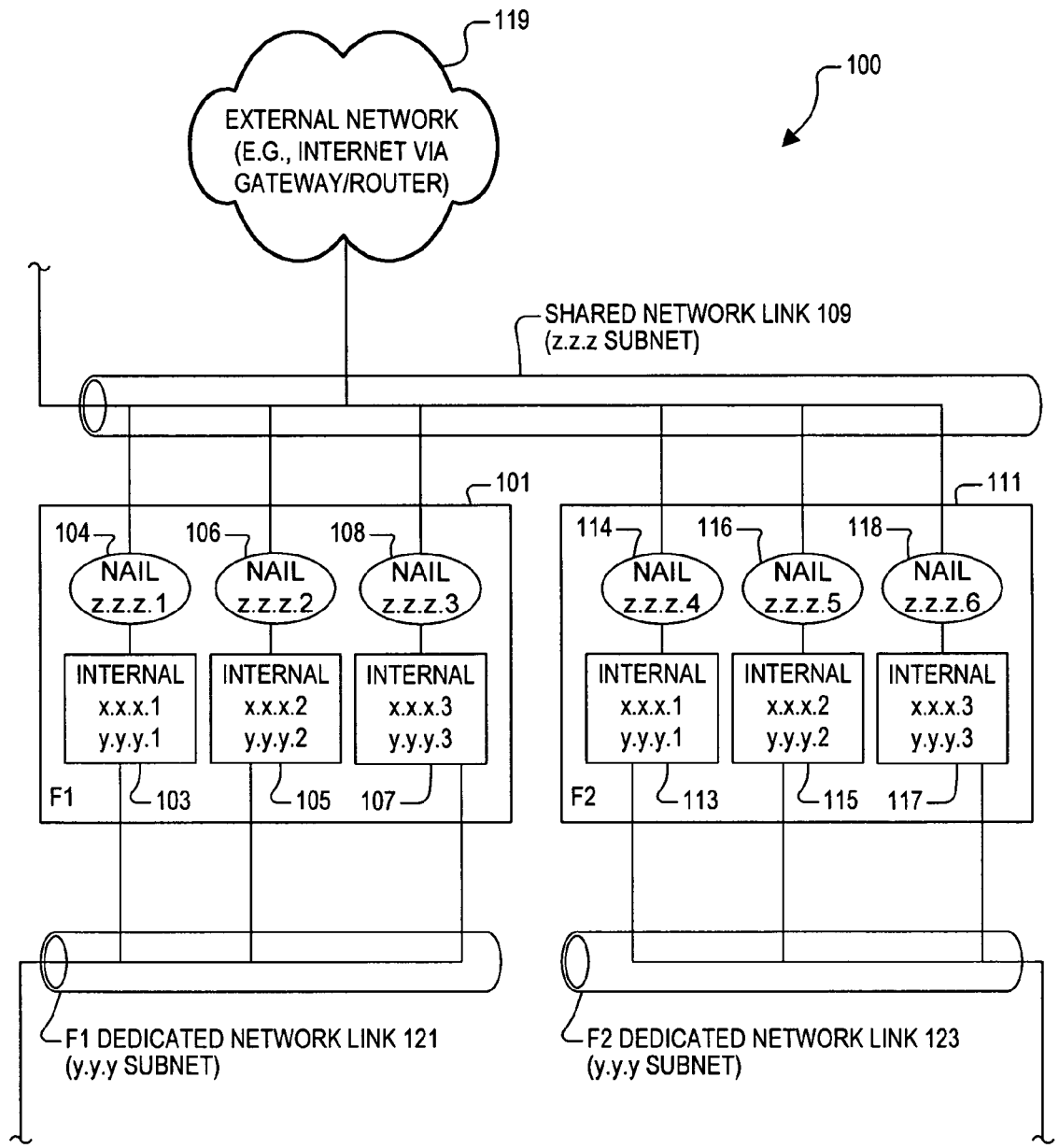
FIG. 1 is a simplified block diagram of a network of cloned federations illustrating a potential solution to avoid conflicts between cloned members within the federations.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The related disclosure (entitled "Network Abstraction And Isolation Layer For Masquerading Machine Identity Of A Computer", Ser. No. 10/950,355) introduced a network abstraction and isolation layer (NAIL) configuration that provided network abstraction and network isolation of computer systems or servers in a network. The term "server" as used herein refers to any computing platform capable of running an operating system (OS) whether physical or virtual. Virtualization software converts a single physical server into a pool of logical computing resources including one or more logical or virtual servers. Network abstraction (NA) enables a computer's network identity to be aliased or altered. Examples of network abstraction include active/passive clusters in which cluster nodes share an identity that moves during failover and in application farms when a single identity represents the external entry point for the entire farm even though the actual requests are distributed to individual nodes. The Domain Name Service (DNS) illustrates network abstraction and the ability to provide indirection and aliasing. Network isolation (NI) enables a computer's Network Identity to be obscured or blocked. Examples of network isolation include Network Address Translator (NAT) systems that aggregate requests from multiple computers through a single connection and Firewalls that selectively block network traffic directed to a specific computer(s). Virtual Local Area Networks (VLANs) keep network traffic from one set of computers from interacting with traffic from another set even when they are connected to the same physical device.

A NAIL configuration combines abstraction and isolation to enable control of a computer's network identity such that all of its in-bound and out-bound network communication can be intercepted and aliased. Computers on the isolation side of the NAIL have a consistent and carefully controlled network identity that is independent of external requirements. Ideally, the isolated computer does not determine that its network communications have been altered or its identity abstracted. Devices on the abstraction side of the NAIL configuration see a virtualized network identity of the isolated computer that may or may not represent its actual network characteristics. Ideally, computers communicating with an abstracted computer do not determine that the target of their communication has a different network identity.

NAIL, in general, works to masquerade a server's internet protocol (IP) address (or network identity). This allows servers to be cloned or otherwise interact even though they would otherwise have networking conflicts. One principle benefit of NAIL is that servers can be cloned without having to modify internal IP dependencies or even system names or SIDs. NAIL allows multiple exact copies of virtual machines to be deployed in a networked environment without having to modify the IP address in each of the copies. NAIL provides a significant advantage in configurations in which there are applications running in the virtual machine OS that use hard-coded IP addresses in numerous locations. Significant investment is made to ensure that applications executing on a server work properly. NAIL protects such investments since the servers may be cloned without the need to change the server configuration.

It is desired, however, to clone groups or federations of servers that must interact with each other on the same network. The term "federation" means a closely knit or tightly coupled group of servers located in a dedicated subnet, where each server is a member of the group or federation. A federation is cloned for various reasons, including, for example, redundancy or scalability. If a federation is cloned (e.g., each member from one federation duplicated to form a second federation), each member of the federation must be updated to reflect the masqueraded address of the other servers in the federation. The servers in each federation must be able to communicate directly with one another over the network; direct communication implies communication using the internal IP addresses hard-coded in each server. Cloned federations on the same network result in potential communication conflicts between cloned members. For example, a first-tier member from a first group of servers collides with its cloned counterpart, which is the first-tier member of a second group cloned from the first.

FIG. 1 is a simplified block diagram of a network 100 of cloned federations illustrating one solution to avoid conflicts between cloned members within the federations. The network 100 includes a first federation 101 (F1) and a second federation 111 (F2). F1 101 includes three servers 103, 105 and 107 and F2 111 includes three servers 113, 115 and 117. F2 is cloned from F1 in which server 113 is a clone of 103, server 115 is a clone of 105, and server 117 is a clone of 107. The servers 103, 113 include the same internal address x.x.x.1; the servers 105, 115 include the same internal address x.x.x.2; and the servers 107, 117 include the same internal address x.x.x.3. The federations F1 101 and F2 111 share a network link 109 defined as a z.z.z subnet for accessing an external network 119. The external network 119 may be, for example, the internet accessed via a gateway or a router or the like (not shown).

Conflicts would otherwise exist on the shared network link 109 given the cloned internal addresses x.x.x.1, x.x.x.2 and x.x.x.3. Each of the servers 103, 105, 107 and 113, 115, 117 is interfaced to a corresponding NAIL 104, 106, 108 and 114, 116, 118, respectively, which substitutes the internal address x.x.x.A with subnet addresses z.z.z.B, where "A" denotes the original final or last IP address octet of each particular server, and where "B" denotes the substituted last IP address octet. As shown, the substituted addresses z.z.z.B are unique on the shared network link 109, or B=1, 2, 3, 4, 5 and 6 for the servers 103, 105, 107, 113, 115 and 117, respectively, to avoid conflict on the shared network link 109 for accessing the external network 119.

The network 100 employs an additional, dedicated network medium for each federation F1 101 and F2 111. In particular, a dedicated network link 121 is provided for F1101 and a dedicated network link 123 is provided for F2 111. Each of the dedicated network links 121, 123 are defined as y.y.y subnets as shown. Each of the servers 103-107 and 113-117 includes an additional network interface card (NIC) or the like (not shown), each configured to operate on a respective one of the y.y.y subnet network links 121 and 123. As shown, the servers 103 and 113 include NICs with addresses y.y.y.1; the servers 105 and 115 include NICs with addresses y.y.y.2; and the servers 107 and 117 include NICs with addresses y.y.y.3. There are no conflicts between like y.y.y subnet addresses since they are used on separate, dedicated network links 121 and 123 servicing their respective federations F1 101 and F2 111, respectively.

The network identity of each of the federated servers F1 101 and F2 111 on the private network 100 does not have to be masqueraded because it would not conflict with other servers when cloned. Communication between the federated servers is completely private and does not share bandwidth. Unfortunately, this configuration is complex to construct and maintain and consumes additional networking resources. For physical devices, each of the servers 103-107 and 113-117 include two separate NICs at significant cost and complexity, including a first NIC for interfacing the shared network link 109 and a second NIC for interfacing a corresponding one of the dedicated network links 121, 123. For virtual devices, additional virtual resources within the virtualization platform are consumed and must be configured and maintained. Further, virtual networks cannot cross between virtualization platform hosts. It is desired to provide a solution for physical and/or virtual configurations to allow intra-group communication while optionally preventing inter-group communication with all of the server groups or federations coupled to the same network medium without incurring additional network resources or configuration effort.

Figure 2:
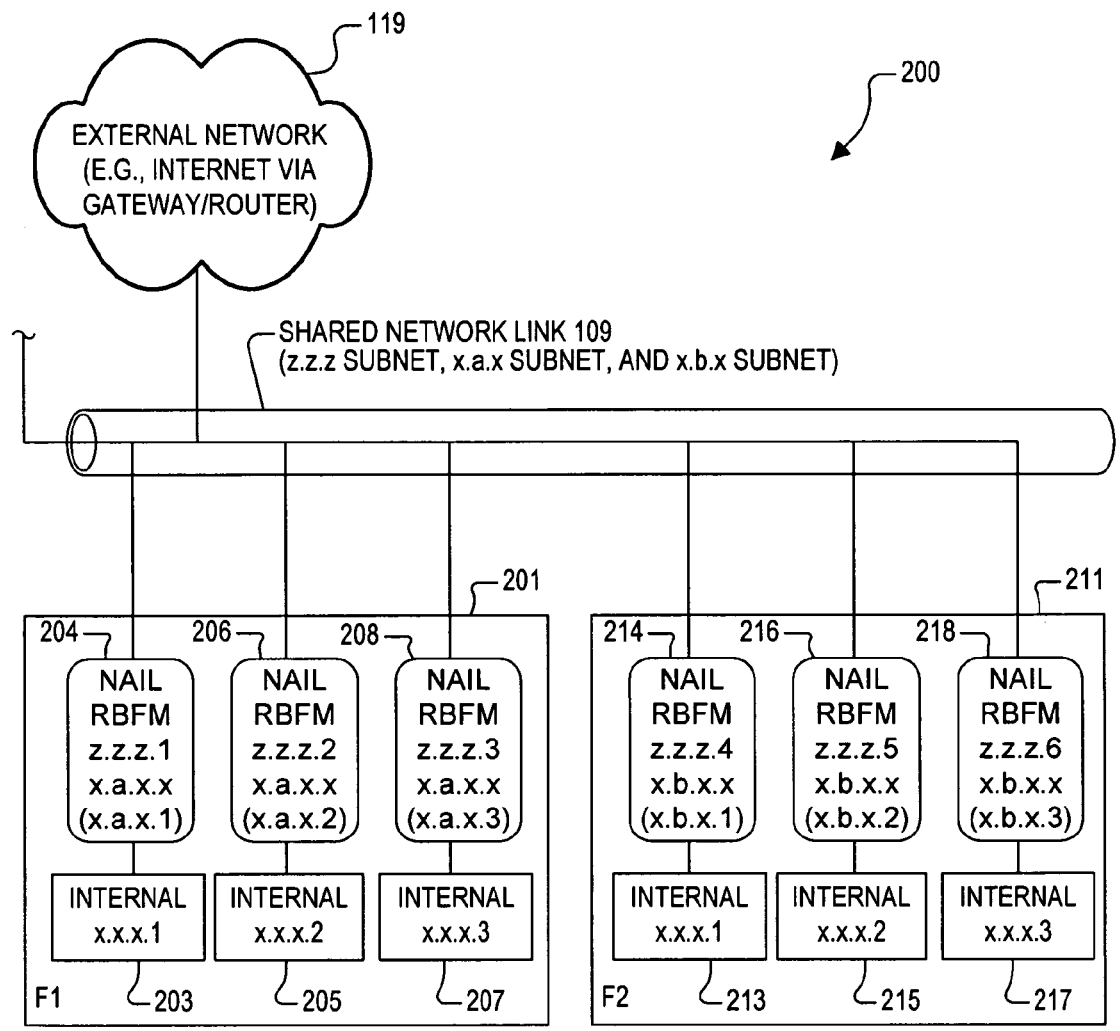
FIG. 2 is a simplified block diagram of a network of cloned federations and illustrating a NAIL RBFM solution according to an embodiment of the present invention to avoid conflicts between cloned members within the federations using the shared network link of FIG. 1.

FIG. 2 is a simplified block diagram of a network 200 of cloned federations F1 and F2 illustrating a NAIL RBFM solution according to an embodiment of the present invention to avoid conflicts between cloned members within the federations using the shared network link 109. Similar components of the network 100 assume identical reference numbers, including the external network 119 and the shared network link 109. The dedicated network links 121 and 123 are no longer needed. The federations F1 101 and F2 111 are replaced with federations F1 201 and F2 211, respectively, where F2 211 is a clone of F1 201. The servers 103, 105 and 107 are replaced with similar servers 203, 205 and 207 for F1 201 and the servers 113, 115 and 117 are replaced with similar servers 213, 215 and 217 for F2 211. The servers 203-207 and 213-217 do not need additional NICs (physical or virtual) or other network resources for communicating on additional networks (e.g., resources with internal addresses for communicating on subnet y.y.y) and thus each includes only one NIC (physical or virtual) for communicating on the shared network link 109. The servers 203-207 thus each include only one internal address, namely, x.x.x.1, x.x.x.2 and x.x.x.3, respectively, and the servers 213-217 each also include only one internal address, namely, x.x.x.1, x.x.x.2 and x.x.x.3, respectively. The NAILs 104-108 and 114-118 are replaced with NAIL rules-based federation and masquerades (RBFMs) 204, 206, 208, 214, 216 and 218, respectively, as further described below.

Each of the NAIL RBFMs 204, 206, 208, 214, 216 and 218 are interfaced to the servers 203, 205, 207, 213, 215 and 217, respectively, and operate in a similar manner as the NAILs 104-108 and 114-118 with respect to the external network 119 and substitutes the internal address x.x.x.A to subnet addresses z.z.z.B. The NAIL RBFMs 204, 206, 208, 214, 216 and 218 each perform additional IP address translation or substitution functions to enable intra-group or intra-federation communication while optionally preventing inter-group or inter-federation communication on the shared network link 109 while ensuring that there are no IP collisions between the federations F1 201 and F2 211. The RBFM optionally blocks direct, non-RBFM intercommunication between federated servers. As shown for the network 200, the NAIL RBFMs 204-208 perform an RBFM transform to a new subnet x.a.x and the NAIL RBFMs 214-218 perform an RBFM transform to a new subnet x.b.x. In each case, the first, third and last octets of the IP address remain unchanged and the second octet is changed, replaced, substituted or otherwise modified. An octet value of "x" in the new address denotes that the original octet is unchanged. The second octet of the federation F1 201 is changed to a new value "a" and the second octet of the federation F2 211 is changed to a new value "b", where the octet values "a" and "b" are different. Thus, NAIL RBFM 204, which is interfaced to the server 203, transforms the internal address x.x.x.1 to x.a.x.1 and advertises the new address on the shared network link 109.

In a similar manner, the NAIL RBFM 206, which is interfaced to the server 205, transforms the internal address x.x.x.2 to x.a.x.2 and advertises the new value on the shared network link 109, and the NAIL RBFM 208, which is interfaced to the server 207, transforms the internal address x.x.x.3 to x.a.x.3 and advertises the new value on the shared network link 109. Also, the NAIL RBFM 214, which is interfaced to the server 213, transforms the internal address x.x.x.1 to x.b.x.1 and advertises the new value on the shared network link 109; the NAIL RBFM 216, which is interfaced to the server 215, transforms the internal address x.x.x.2 to x.b.x.2 and advertises the new value on the shared network link 109; and the NAIL RBFM 218, which is interfaced to the server 217, transforms the internal address x.x.x.3 to x.b.x.3 and advertises the new value on the shared network link 109.

The RBFM transform effectively creates two separate and independent subnets x.a.x and x.b.x on the same network link 109 to enable intra-federation communication while preventing inter-federation conflicts. In this manner, there are no address conflicts between servers 203 and 213 (x.a.x.1 vs x.b.x.1), or between servers 205 and 215 (x.a.x.2 vs x.b.x.2), or between servers 207 and 217 (x.a.x.3 vs x.b.x.3) on the shared network link 109. To enable bidirectional communications, each NAIL RBFM 204-208 and 214-218 performs two functions. For select outbound traffic (e.g., traffic intended for another member within the same federation), the NAIL RBFM applies the federation's unique transform to both source and destination addresses, which effectively redirects the request to other servers in the same federation. For inbound traffic, the NAIL RBFM transforms the server's network identity based on information unique to each federation. In particular, the NAIL RBFM compares the destination address of traffic on the shared network link 109 with its transformed internal address, and in the event of a match, retrieves the traffic, applies the reverse (or inverse) of the federation's unique transform to both source and destination addresses, and passes the transformed traffic to its server. The internal address of each server in the federation is unchanged and the apparent address of the other servers in the federation are unchanged. Traffic that is not directed to other federated servers (e.g. traffic going to the gateway or a different subnet) is not transformed by NAIL RBFM.

Each NAIL RBFM transform has an operation and a key. Many different types of operations are contemplated, including the replace or substitute function described above, masking functions (e.g., subnet masking or the like), logical operations (e.g., AND, OR, XOR, NAND, NOR, etc.), mapping functions, prefix functions, or any other suitable function or any combination of such functions. Mapping or similar lookup transformations may be implemented in any manner, such as using a lookup table or the like. All such transform operations may be implemented in any appropriate or standard manner, such as using software or firmware, logic circuitry, lookup tables, etc., to perform the desired substitution, replacement, logical or mathematical function. The transform operation may further include transformation between different protocols (e.g., AppleTalk, Banyan VINES, etc.) A replace function is the most general in which 1 or more bits, or groups of bits, or selected octets of the address are simply replaced with new values. The inverse of the selected federation transform results in the original value. The key is the object, operand or value associated with the operation. For the network 200, for example, the second octet of the internal addresses x.x.x.1-x.x.x.3 of the federation F1 201 is replaced with the key "a" by each NAIL RBFM 204-208 for intra-federation outbound traffic of the servers 203-207. Likewise, the second octet of the internal addresses x.x.x.1-x.x.x.3 of the federation F2 211 is replaced with the key "b" by each NAIL RBFM 214-218 for intra-federation outbound traffic of the servers 213-217. The operation is reversed for intra-federation inbound traffic, in which the second octet value "a" is replaced with the original value "x" by the NAIL RBFMs 204-208 of federation F1 201, or in which the second octet value "b" is replaced with the original value "x" by the NAIL RBFMs 214-218 of federation F2 211.

The resulting subnet or federation addresses should be unique for each federation to avoid collisions with other federations including cloned federations. Further, in one embodiment, the federation addresses are non-routable in the public or external domains. Thus, for example, the transformed addresses appearing on the shared network link 109 remain private and are not routed to the external network 119. The Internet Assigned Numbers Authority (IANA) has reserved three blocks of the IP address space for private internets (local networks), including 10.x.x.x (or 10.0.0.0-10.255.255.255), 172.16.x.x (or 172.16.0.0-172.31.255.255), and 192.168.x.x (or 192.168.0.0-192.168.255.255). Also, IP addresses in the 169.254.x.x range (or 169.254.0.0-169.254.255.255) are reserved for Automatic Private IP Addressing. Such private IP addresses are generally not used on the public Internet.

Figure 3:
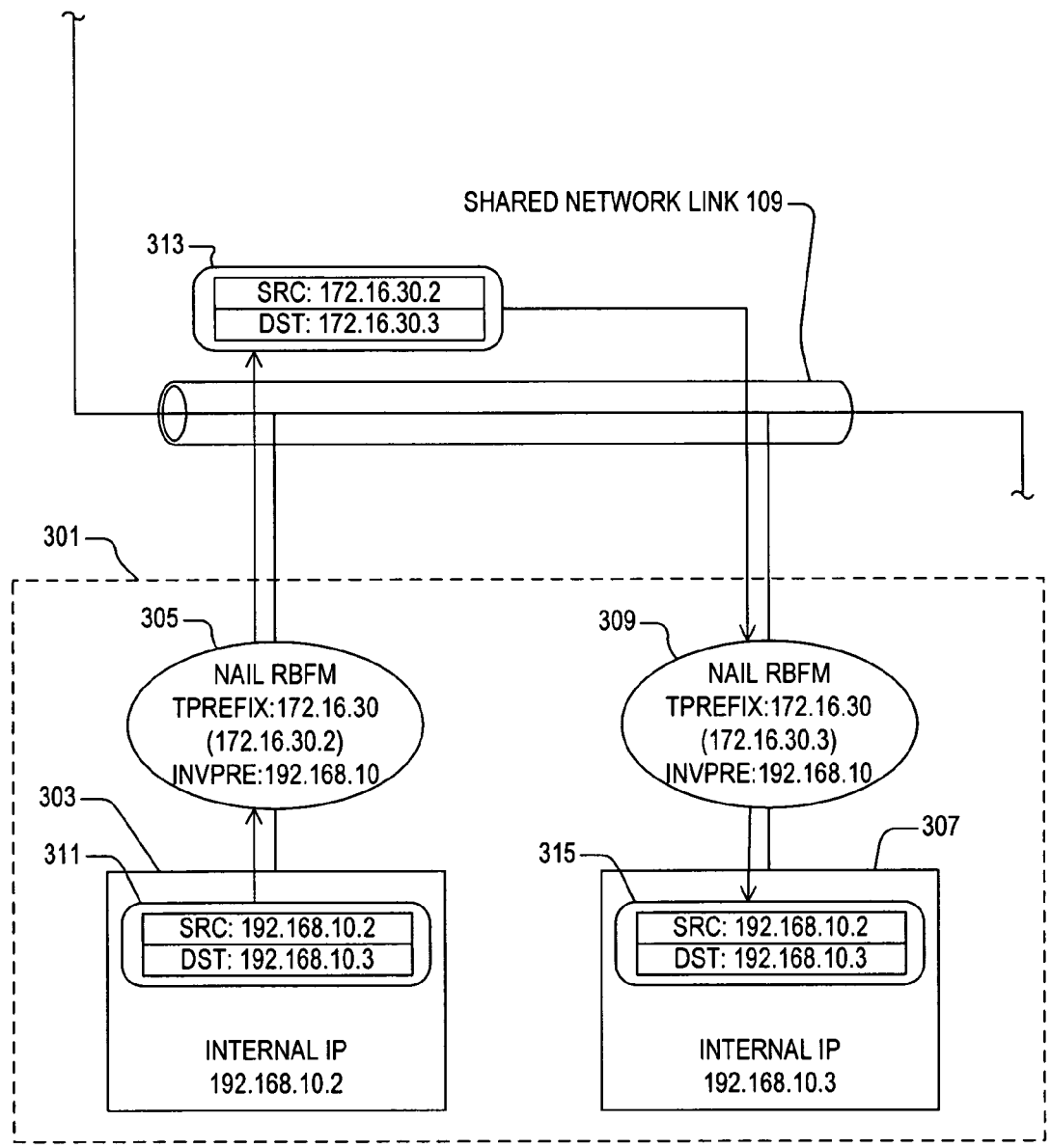
FIG. 3 is a simplified block diagram illustrating an exemplary RBFM transform process according to an embodiment of the present invention in more detail.

FIG. 3 is a simplified block diagram illustrating an exemplary RBFM transform process according to an embodiment of the present invention in more detail using a different transform. A federation 301 coupled to the shared network link 109 includes a server 303 interfaced with a NAIL RBFM 305 and an internal local IP address 192.168.10.2, and another server 307 interfaced with a NAIL RBFM 309 and an internal local IP address 192.168.10.3. Each NAIL RBFM 305 and 309 employs a replace operation and a key in the form of an IP transformation prefix (TPREFIX) 172.16.30 in which the NAIL RBFM transforms selected outgoing IP addresses directed to other peers in the same federation by replacing the first three octets with the value 172.16.30. In this manner, the NAIL RBFM 305 transforms the internal address 192.168.10.2 of the server 303 into an external address 172.16.30.2 and advertises this external address on the shared network link 109 on behalf of the server 303. In a similar manner, the NAIL RBFM 309 transforms the internal address 192.168.10.3 of the server 307 into an external address 172.16.30.3 and advertises this external address on the shared network link 109 on behalf of the server 307. The servers 303 and 307 belong to the same federation 301 since having the same transformed addresses. Each NAIL RBFM 305 and 309 also employs a reverse replace operation and key in the form of an IP transformation inverse prefix (INPRE) 192.168.10, in which each NAIL RBFM transforms received IP addresses by replacing the first three octets with the value 192.168.10.

As an example, the server 303 internally generates a packet 311 using its own address 192.168.10.2 as the source address and a destination address 192.168.10.3 to send the packet 311 to the server 307. The packet 311 is provided to and processed through the NAIL RBFM 305, which asserts the packet on the network link 109 as a packet 313, which is the same packet with modified addresses. In particular, the source and destination addresses have been transformed using the prefix 172.16.30 to 172.16.30.2 and 172.16.30.3, respectively. The NAIL RBFM 309 detects the destination address of the packet 313 as belonging to the server 307, and retrieves and transforms the packet 313 into a packet 315. The packet 315 is the same as the packet 313 with modified addresses using the reverse or inverse transform. In particular, the source and destination addresses of the packet 313 have been changed using the prefix 192.168.10 to source and destination addresses 192.168.10.2 and 192.168.10.3, respectively, of the packet 315. The NAIL RBFM 309 passes the inversely transformed packet 315 to the server 307, which internally recognizes the destination address of the packet 315 as its own and notes the source of the packet as 192.168.10.2. The packets 311 and 315 are substantially identical even though communicated via the shared network link 109 as a packet 313 with modified addresses. A packet sent from the server 307 to the server 303 via the NAIL RBFMs 309 and 305 and the shared network link 109 is processed in a similar manner.

A network abstraction and isolation layer rules-based federation and masquerading solution according to an embodiment of the present invention creates additional masqueraded IP address(es) for each NAIL RBFM based on a set of transformation rules. When a NAIL RBFM server senses outbound traffic from its local server to a peer in the same group or federation, it automatically remaps the internal addresses to group-prefixed addresses. When the NAIL RBFM server senses inbound traffic from one of the servers in its federation, it automatically remaps the IP addresses to internal addresses that its local server will understand. Using group-prefixed addresses on a shared network link is collision-free, as each federation prefix is unique to a federation and the servers within a federation have different internal addresses by definition. This rules-based federation and masquerade enables a NAIL RBFM server to communicate on a shared network link using a unique but predictable IP address. If each member of the federation uses the same transformation, then they easily intra-communicate without requiring a dedicated network. Each federation sharing a network link has a unique transform, which is updated for each federation after cloning.

Although the present invention has been described in considerable detail with reference to certain preferred versions thereof, other versions and variations are possible and contemplated. For example, the NAIL RBFM is shown interfaced to its server, and may alternatively be part of the server or incorporated therein. Also, one of the federations, such as the original from which one or more additional federations are cloned, may be configured without the full NAIL RBFM function as long as the remaining federations are transformed into different subnets to avoid conflict. Those skilled in the art should appreciate that they can readily use the disclosed conception and specific embodiments as a basis for designing or modifying other structures for providing out the same purposes of the present invention without departing from the spirit and scope of the invention as defined by the following claims.

What is claimed is:

1. A network, comprising:
   a private network link;
   a first federation, coupled to said private network link, being associated with a first private subnet and including a first plurality of servers, each server having a corresponding one of a plurality of local addresses;
   a second federation, coupled to said private network link, being associated with a second private subnet and including a second plurality of servers, each server of said second plurality of servers being a copy of a corresponding one of said first plurality of servers and including a corresponding one of said plurality of local addresses;
   a plurality of first network abstraction and isolation layer (NAIL) rules-based federation and masquerading (RBFM) interfaces, each interfacing a corresponding one of said first plurality of servers to said private network link, and each performing an address transformation to associate said corresponding server into said first private subnet; and
   a plurality of second NAIL RBFM interfaces, each interfacing a corresponding one of said second plurality of servers to said private network link, and each performing an address transformation to associate said corresponding server into said second private subnet.

2. The network of claim 1, wherein each NAIL RBFM interface is operative to identify outgoing traffic to another server within a common one of said first and second federations, to transform source and destination addresses of said outgoing traffic, and to pass said transformed traffic onto said private network link.

3. The network of claim 1, wherein each NAIL RBFM interface is operative to identify incoming traffic on said private network link from another server within a common one of said first and second federations, to transform source and destination addresses of said incoming traffic, and to pass transformed traffic to said corresponding server.

4. The network of claim 1, wherein said address transformation comprises modifying at least one bit of an address.

5. The network of claim 1, wherein said address transformation comprises a lookup transformation.

6. The network of claim 1, wherein said address transformation comprises substituting a prefix of an internet protocol (IP) address.

7. The network of claim 1, wherein said address transformation comprises replacing an address.

8. The network of claim 1, wherein each of said first and second NAIL RBFM interfaces selectively blocks communications between said first and second federations.

* * * * *